US011931605B2

(12) United States Patent
Covington

(10) Patent No.: US 11,931,605 B2
(45) Date of Patent: Mar. 19, 2024

(54) EQUIPMENT CARRYING SYSTEM

(71) Applicant: Ron Covington, Mansfield, TX (US)

(72) Inventor: Ron Covington, Mansfield, TX (US)

( * ) Notice: Subject to any disclaimer, the term of this patent is extended or adjusted under 35 U.S.C. 154(b) by 452 days.

(21) Appl. No.: 16/732,035

(22) Filed: Dec. 31, 2019

(65) Prior Publication Data

US 2021/0196994 A1 Jul. 1, 2021

(51) Int. Cl.
*A62B 25/00* (2006.01)
*A62B 7/02* (2006.01)

(52) U.S. Cl.
CPC ................ *A62B 25/00* (2013.01); *A62B 7/02* (2013.01)

(58) Field of Classification Search
CPC .. A62B 25/00; A62B 9/04; A62B 7/02; A45F 2005/002; A45F 2005/1013; A45F 3/14; A45F 2003/003; B63C 11/02; B63C 11/22
See application file for complete search history.

(56) References Cited

U.S. PATENT DOCUMENTS 2,406,888 A * 9/1946 Meidenbauer, Jr. ..... A62B 7/02 137/506
2,464,069 A * 3/1949 Benson ................ B65D 23/104 206/466
3,105,359 A * 10/1963 Ellis ........................ B63C 11/30 441/106
3,135,098 A * 6/1964 Root ....................... B63C 11/08 2/338
4,949,889 A * 8/1990 Carson .................... B63C 11/22 224/269
5,147,079 A * 9/1992 Heather .................... A45F 3/14 294/157
5,259,372 A * 11/1993 Gross ....................... A61G 1/04 128/200.24
5,392,808 A * 2/1995 Pierce ............... A61M 16/0672 128/207.18
5,407,110 A * 4/1995 Marsh, Jr. ................. A45F 5/00 294/149
5,511,846 A * 4/1996 Fuller ...................... A45C 3/00 383/117
5,622,346 A * 4/1997 Story, Jr. ................... A45F 5/02 224/675
5,806,730 A * 9/1998 Deno ....................... B62J 11/04 224/579
D410,335 S * 6/1999 Raich ............................ D3/315
(Continued)

FOREIGN PATENT DOCUMENTS

KR 20130075366 A * 7/2013

*Primary Examiner* — Kathryn E Ditmer
(74) *Attorney, Agent, or Firm* — Law Office of Jeff Williams PLLC; J. Oliver Williams

(57) ABSTRACT

Embodiments of the present invention disclose an equipment carrying system configured for sliding over a valveless end of a gas cylinder. The assembly includes a main body having a plurality of straps forming a webbing; a seat portion formed within the main body, the seat portion being configured to receive the valveless end of the gas cylinder; an auxiliary cylinder assembly coupled to the main body, the auxiliary cylinder assembly configured to hold a second gas cylinder; a handle coupled to the seat portion, the handle used to lift and carrying the main body; and wherein the main body, the auxiliary cylinder assembly, and the handle hang from the seat portion on the valveless end of the gas cylinder.

14 Claims, 6 Drawing Sheets

(56) References Cited

U.S. PATENT DOCUMENTS

| | | | | | |
|---|---|---|---|---|---|
| 5,918,785 | A * | 7/1999 | Irose | G10G 7/005 294/157 |
| 5,941,434 | A * | 8/1999 | Green | A45F 5/02 224/195 |
| 6,347,730 | B1 * | 2/2002 | Frederick | A45F 5/12 294/157 |
| 6,889,688 | B1 * | 5/2005 | Wright | B65H 75/4402 128/207.18 |
| 6,973,928 | B1 * | 12/2005 | Taylor, II | B63C 11/22 128/201.27 |
| D527,103 | S * | 8/2006 | Nahavandi | D24/128 |
| 7,131,679 | B1 * | 11/2006 | Teran | A62C 13/78 169/30 |
| 7,168,428 | B1 * | 1/2007 | Zoha | A62B 9/04 128/205.24 |
| 7,341,377 | B1 * | 3/2008 | Baxter | B65D 31/12 383/117 |
| 8,979,153 | B2 * | 3/2015 | Scribner | A45F 5/00 294/157 |
| 2003/0010343 | A1 * | 1/2003 | York | A62B 25/00 128/205.21 |
| 2003/0116156 | A1 * | 6/2003 | Jackson | A62B 9/02 128/201.28 |
| 2003/0146332 | A1 * | 8/2003 | Vinding | A61M 16/0672 242/385.1 |
| 2006/0060624 | A1 * | 3/2006 | Duncan | A45F 3/14 294/157 |
| 2013/0320054 | A1 * | 12/2013 | Kruse | A45C 3/00 224/191 |

* cited by examiner

EQUIPMENT CARRYING SYSTEM

BACKGROUND

1. Field of the Invention

The present application relates to modular load carrying equipment, and more particularly to rapid intervention team bags for firefighting.

2. Description of Related Art

Rapid intervention team bags or "RIT bags" are equipment bags used for the search and rescue of firefighters in distress. RIT bags generally store an emergency air cylinder, a breathing mask, and various other emergency equipment used to assist that is hand carried by a rescue team to the distressed firefighter. However, RIT bags come with several disadvantages. RIT bags are generally hand carried or dragged by at least one member of a two-man rescue team. The weight and size of the RIT bag presents a challenge in transporting the bag in a hazardous environment that has fallen and/or burning debris, and where visibility is almost zero. Another issue arises where the team must use a ladder to reach other floors. In all situations, the member of the team designated as the "carrier" of the RIT is restricted to only one free hand since the other hand is occupied with carrying the bag. The carrier is hindered in his/her ability to navigate through the environment compared to the other team member. For more challenging situations that require the carrier to use both hands, the carrier must let go of the bag; however, in a smoke filled environment, this can create a problem in relocating the bag again due to low visibility from the smoke.

A further disadvantage of the RIT bag is that the bag lies on the floor during use and has a number of compartments for holding equipment. The equipment is taken out to assist in providing air to a fellow firefighter or person. As the items are removed, especially in low visibility environments, it gets difficult to see where those items are located. Items get lost. When needing to repack the RIT bag, the operator has to struggle to operate by feel or memory to ensure everything is packed back up and is not loose or has hanging lines outside the RIT bag. While wearing gloves, this is extremely difficult to do. It is not uncommon for hoses from the RIT bag to be a tripping hazard or for items to be lost.

Although advancements have been made, shortcomings remain. Therefore, it is desired to develop a hands-free RIT bag capable of being carried by a single user to allow both crew members the usability of both hands. Additionally, it is desired that the system includes a way to contain hoses to eliminate tripping and also a simplified method of organizing.

BRIEF SUMMARY OF THE INVENTION

Embodiments of the present invention disclose an equipment carrying system configured for sliding over a valveless end of a gas cylinder, for use in rescue team operations. The gas cylinder is ideally the main air tank worn by a member of an emergency response team, such as a firefighter. The main tank provides air to a member of the team during operations. A rescue team is on stand-by in case an emergency occurs and either the emergency response team needs assistance or a victim needs assistance.

An object of the current equipment carrying system is such that it is carriable by a member of the rescue team to allow both hands to be free. Additionally, it is sized to be within the body frame of the wearer. Furthermore, an object of the equipment carrying system is the use of reels selectively located on particular sides of the wearer to eliminate loose hoses and facilitate organization and tidiness. Given the features of the equipment carrying system, both members of a rescue team can now carry in rescue equipment without the loss of performance thereby increasing the effectiveness of the rescue team.

In one embodiment of the present invention, an assembly is provided comprising: a main body having a plurality of straps forming a webbing; a seat portion formed within the main body for attachment to the gas cylinder. An auxiliary cylinder assembly is coupled to the main body and is configured to hold a second gas cylinder or auxiliary air tank. A handle is coupled to the seat portion and is used to lift and carry the main body onto and off of the gas cylinder. The main body, the auxiliary cylinder assembly, and the handle hang from the seat portion on the valveless end of the gas cylinder. Optional retractable reels are selectively located relative to the main body for clean storage and use of air hoses.

Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the various purposes of the present design. It is important, therefore, that the claims be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
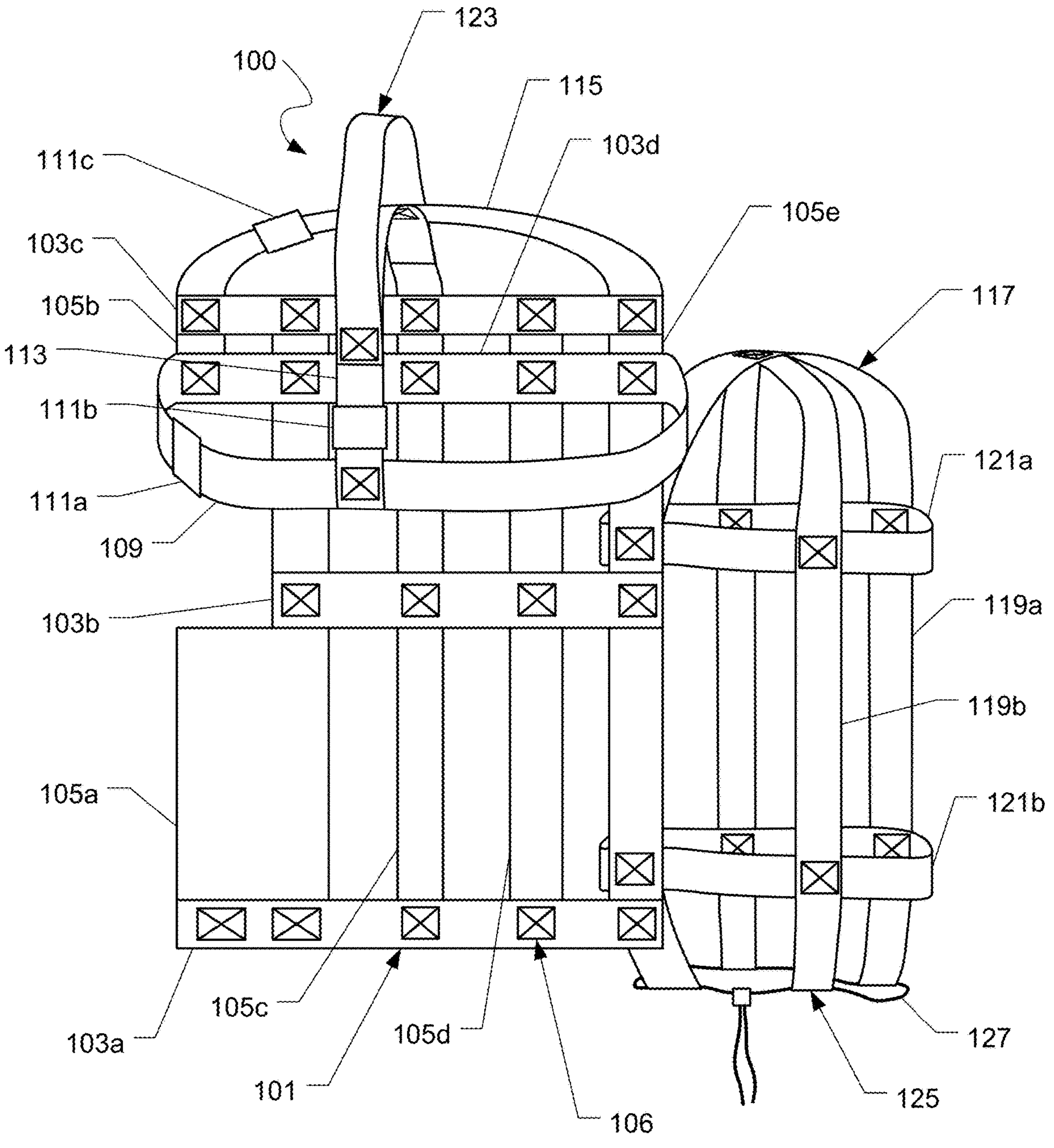
FIG. 1 is a front view of an equipment carrying system, in accordance with an embodiment of the present invention.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The assembly and method in accordance with the present invention overcomes one or more of the above-discussed problems associated with hand carried rapid intervention team bags. In particular, the system of the present invention is an equipment carrying system that is configured for sliding over a valveless end of a gas cylinder that is generally carried on the back of a fireman, the gas cylinder being a primary gas cylinder of a self-contained breathing apparatus (SCBA) that provides the fireman breathable air during firefighting operations. In general, the primary gas cylinder of a SCBA while carried by the fireman is oriented such that a valve stem of the primary gas cylinder is directed towards the ground, and a valveless end of the primary gas cylinder is directed towards a head of the fireman. The equipment carrying system, having a main body, a seat portion, an auxiliary tank assembly, and a handle, is positioned on the valveless end of the primary gas cylinder using the seat portion of the system, wherein the main body, the auxiliary tank assembly, and the handle are permitted to hang from the seat portion. As such, the equipment carrying system permits each fireman to carry their own equipment carrying system hands-free by having the equipment carrying system piggyback on the SCBA instead of requiring either two firemen to carry a RIT bag or drag the RIT bag with only one free hand.

Furthermore, the equipment carrying system is configured for quick deployment. The handle coupled with the seat portion of the equipment carry system permits a user to slide the equipment carrying system on and off the valveless end of the primary gas cylinder. Additionally, the equipment carrying system may have one or more hose reels in communication with an auxiliary gas cylinder carried as part of the auxiliary tank assembly that permits the user to transfer air to a third party. For instance, as part of a Buddy Breathing System (BBS) a first reel connected between a respirator and the auxiliary gas cylinder provides air at an air pressure suitable for breathing by the third party. Alternatively, as part of High Pressure System (HPS) connection, a second reel connected between a primary tank of a third party and the auxiliary gas cylinder permits air to be transferred to the primary tank of the third party, subsequently permitting the third party to breathe the transferred air from the primary tank of the third party through an SCBA air regulator of the third party. The one or more reels are configured to include a retracting mechanism to permit selective automatic retraction of a hose upon disconnection from the third party BBS or HPS connections.

The system will be understood from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system of the present application is illustrated in the associated drawings. As used herein, "system" and "assembly" are used interchangeably. As used herein, a "fastener" is a rod-like hardware device that mechanically joins or affixes two or more members together through a respective concentric set of apertures. For example, a fastener can be a screw, bolt, nail, stud, dowel, rivet, staple, stitching, etc. in conjunction with any applicable nuts and washers generally known in the art of fastening. It should be noted that the articles "a", "an", and "the", as used in this specification, include plural referents unless the content clearly dictates otherwise. Additional features and functions are illustrated and discussed below.

Figure 2:
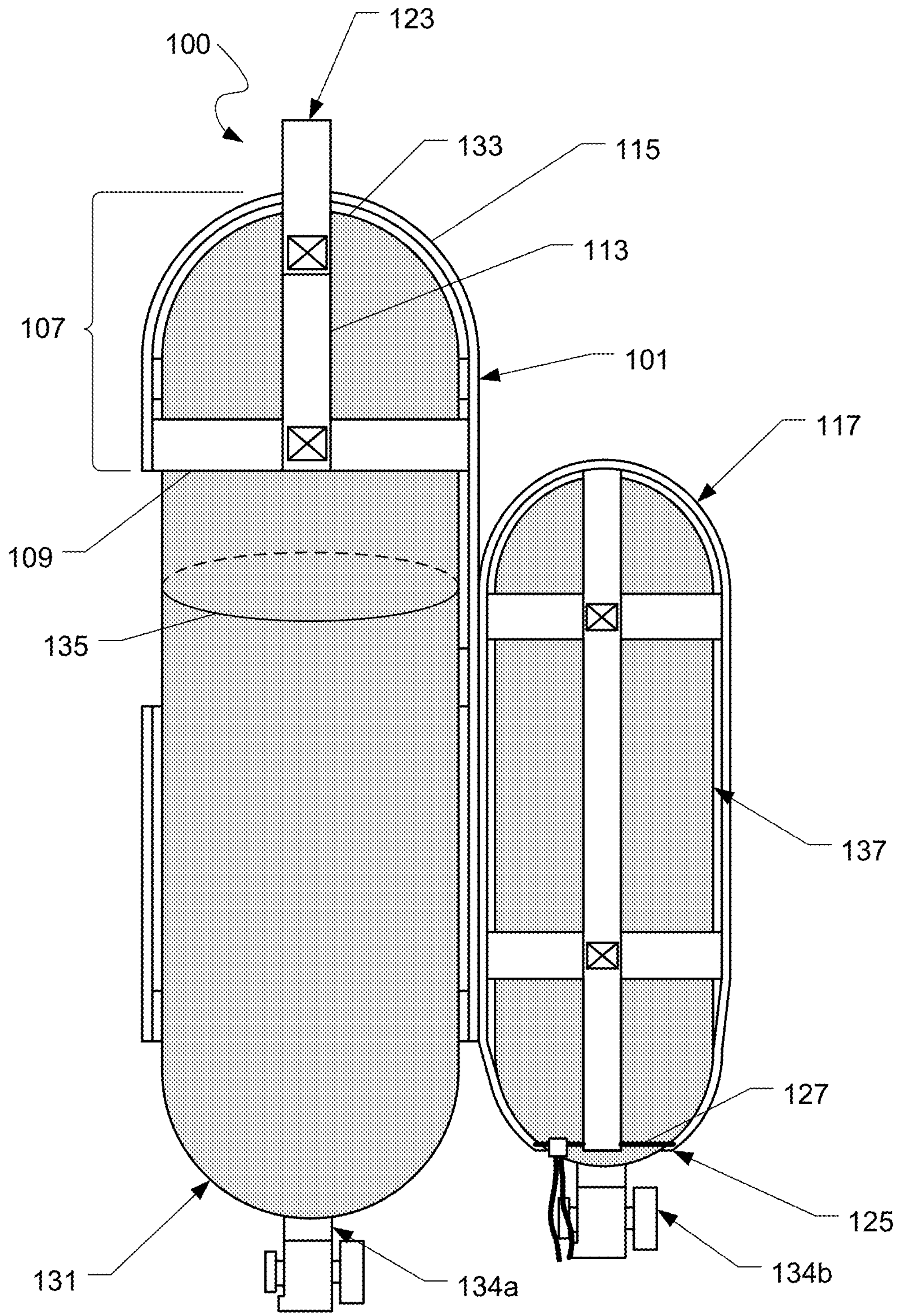
FIG. 2 is a front view of the equipment carrying system of FIG. 1 positioned on a primary air cylinder while equipped with an auxiliary air cylinder.
Figure 3:
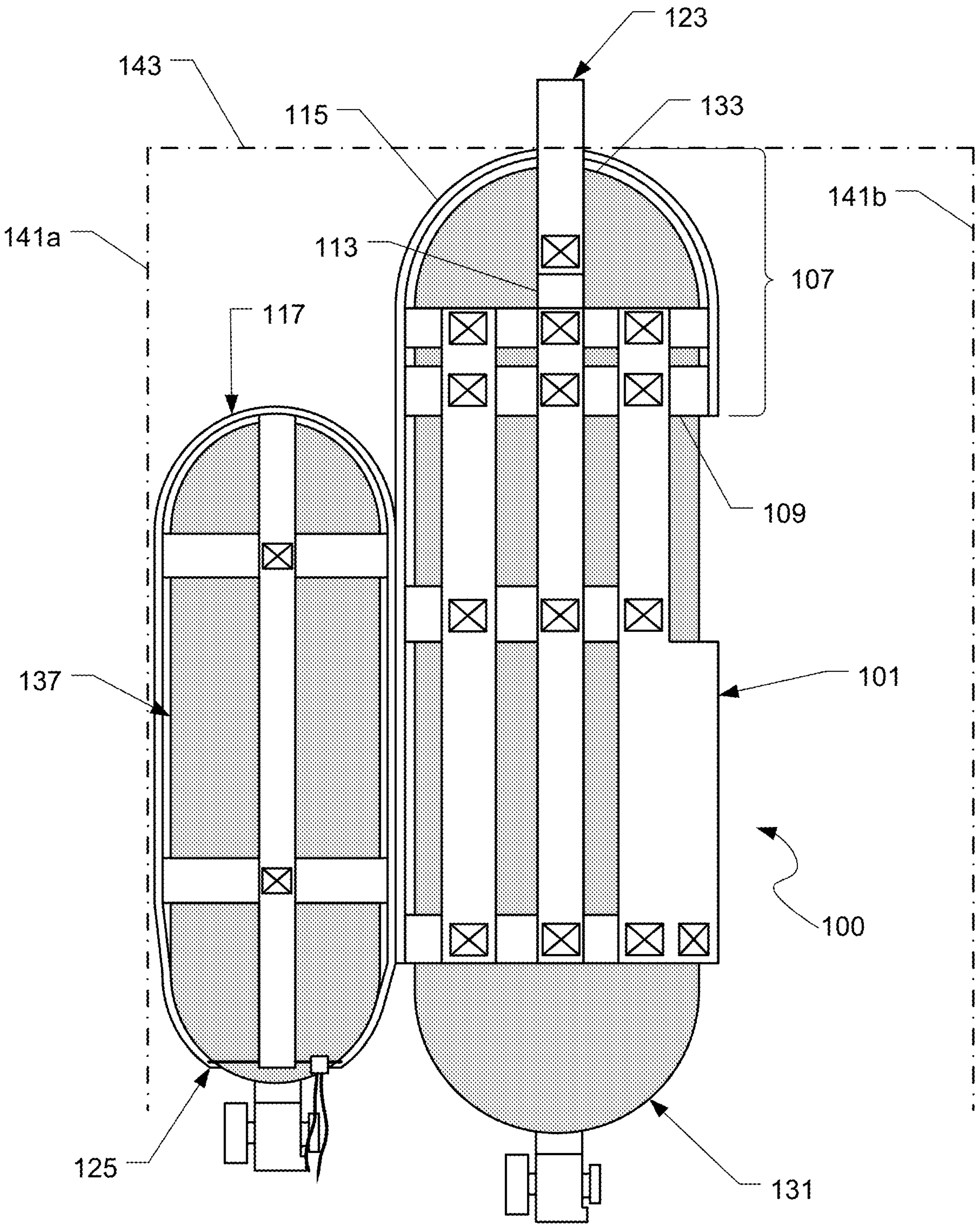
FIG. 3 is a back view of the equipment carrying system of FIG. 2.
Figure 4:
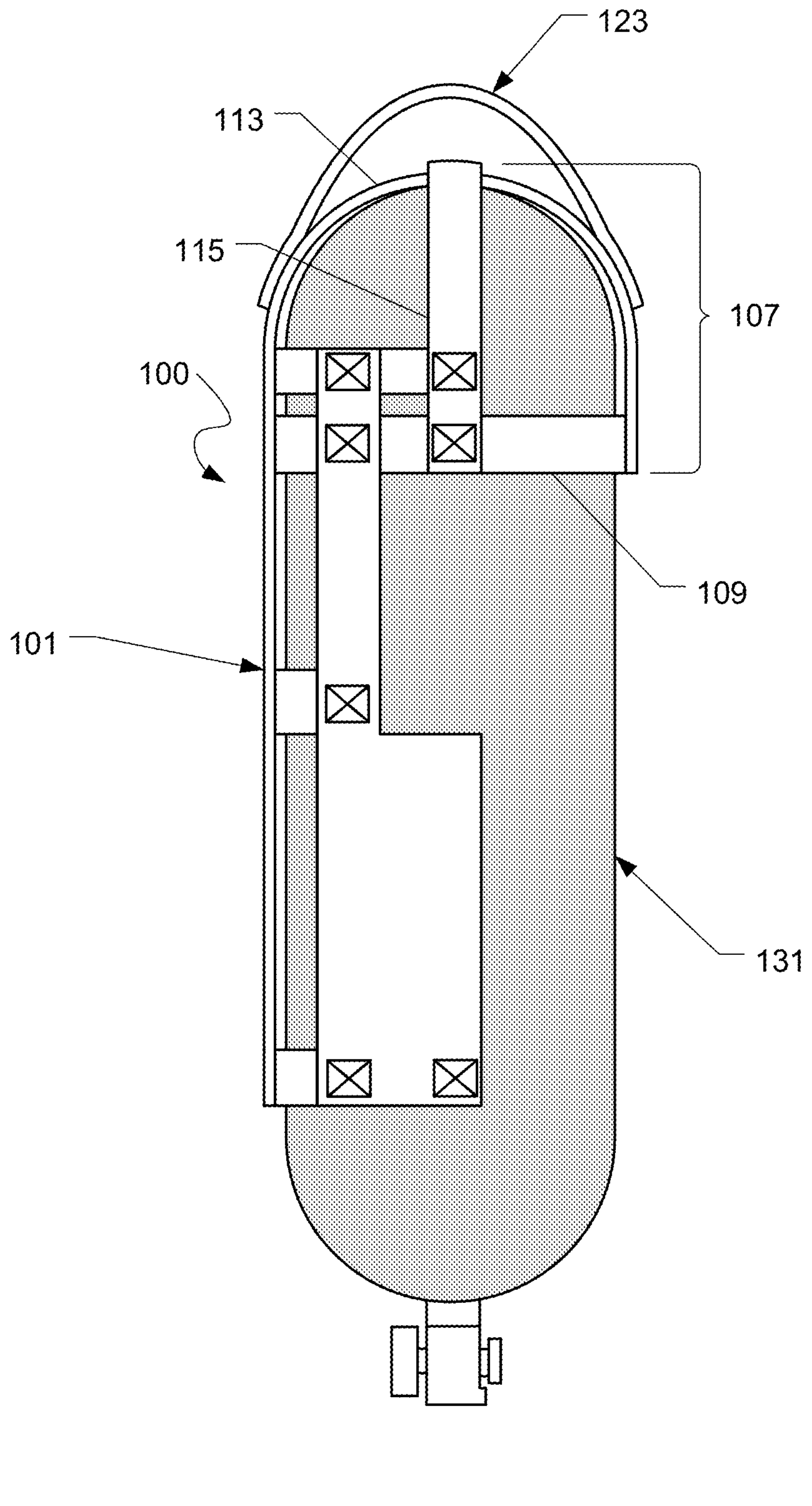
FIG. 4 is a right-hand view of the equipment carrying system of FIG. 2.
Figure 5:
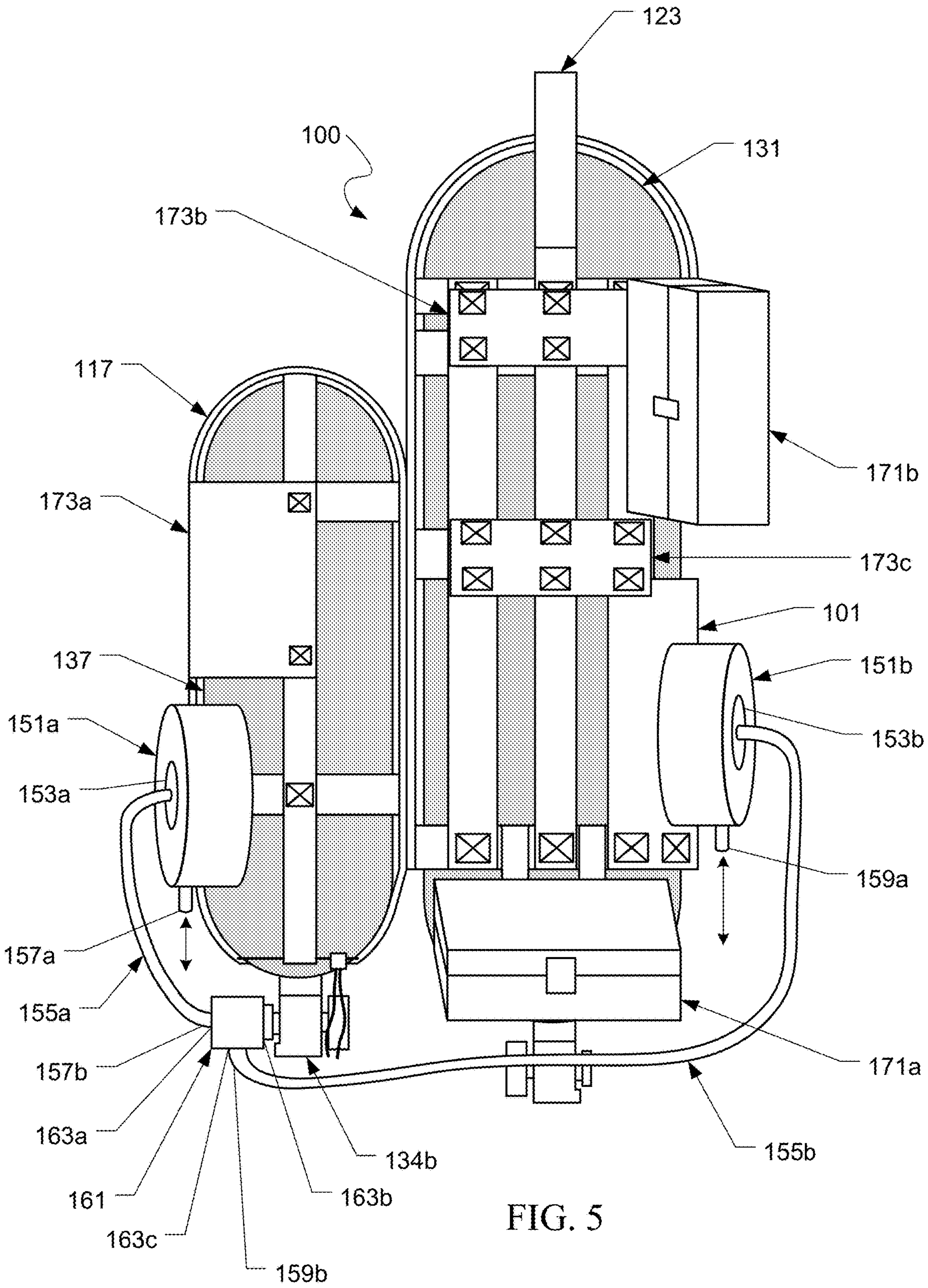
FIG. 5 is a back view of the equipment carrying system of FIG. 2 having additional hose reels, pouches, and high visibility patches.
Figure 6:
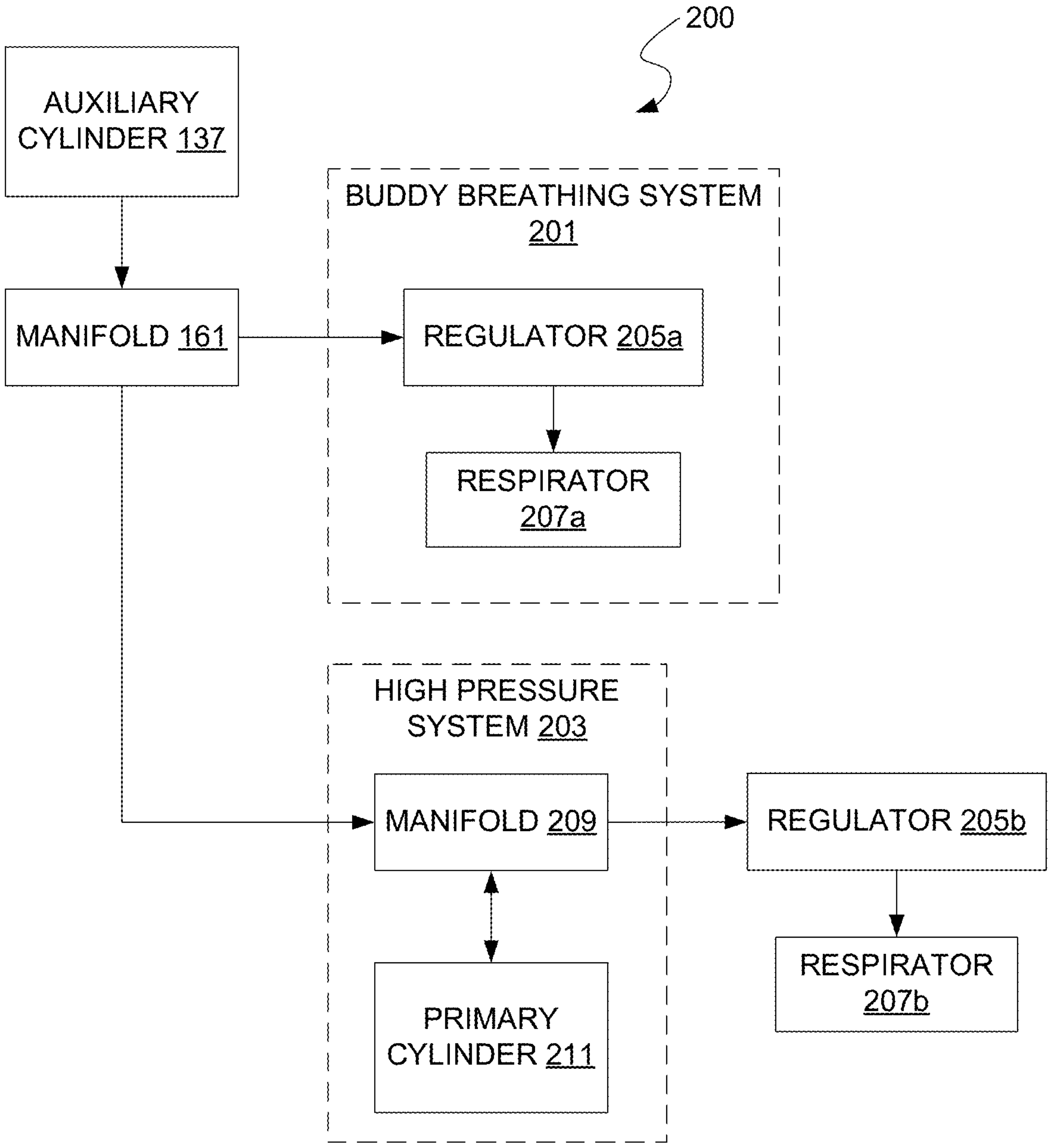
FIG. 6 is an air network environment illustrating connections from the auxiliary air cylinder of FIG. 2 to a third party.

Referring now to the drawings wherein like reference characters identify corresponding or similar elements in form and function throughout the several views. FIG. 1 illustrates a front view of an equipment carrying system. FIGS. 2-4 illustrate various views of the equipment carrying system positioned on a primary air cylinder while equipped with an auxiliary air cylinder. FIG. 5 illustrates a back view of the equipment carrying system that includes hose reels, pouches, and high visibility patches. FIG. 6 is an air network environment illustrating connections from the auxiliary air cylinder of FIG. 2 to a third party.

Referring now to FIG. 1, a front view of equipment carrying system 100 is illustrated in accordance with an embodiment of the present invention.

As used herein, a "front view" is viewed from a back of a carrier while the equipment carrying system is equipped on a SCBA of the carrier. Conversely, a "back view" is viewed towards the back of the carrier while the equipment carrying system is equipped on the SCBA of the carrier. In other words, the front view and the back view are opposing views. Furthermore, a "right-hand view" is viewed towards a right-hand side of the carrier. As used herein, a "carrier" and a "user" are interchangeable. As used herein, "auxiliary tank", "auxiliary cylinder", and "auxiliary gas cylinder" are interchangeable. As used herein, "primary gas cylinder", "primary cylinder", and "gas cylinder" are interchangeable.

In FIG. 1, equipment carrying system 100 includes, but is not limited to, main body 101, seat portion 107 (for clarity, seat portion 107 is further illustrated with respect to FIG. 2), auxiliary cylinder assembly 117, and handle 123. In general, equipment carrying system 100 is an equipment carrying system configured for sliding over a valveless end of a gas cylinder. In this figure, main body 101 has a plurality of straps forming a webbing. For example, main body 101 has cross straps 103*a-d* and straps 105*a-e* fastened by a plurality of stitching (i.e., stitching 106) to form the webbing.

Seat portion 107 is formed within main body 101, wherein seat portion 107 is configured to receive the valveless end of the gas cylinder. Seat portion 107 includes but is not limited to, strap 109, strap 113, and strap 115. Strap 109 is a strap configured to wrap around a circumference of the gas cylinder. Strap 113 and strap 115 are straps configured to cross over the valveless end of the gas cylinder, wherein strap 113 and strap 115 intersect at the valveless end. In this figure, strap 109 is integrated with cross strap 103*d*, strap 115 is integrated with strap 105*c*, and strap 113 is integrated with straps 105*b* and 105*e*. Seat portion 107 is adjustable to accommodate different sized gas cylinders. In other words, strap 109 is adjustable to different circumferences, and straps 113 and 115 are adjustable to adjust a seat height of the valveless gas cylinder within seat portion 107. In this figure, strap fasteners 111*a-c* corresponding to straps 109, 113, and 115 permit the respective straps to have adjustable lengths. For example, strap fasteners 111*a-c* can be buckles or a hook and loop fastener system wherein each strap includes two sub-straps that, when combined and secured by a strap fastener at a selected length, become the respective strap. In other words, strap 109 may include two sub-straps that are secured together with strap fastener 111*a* to become strap 109. Seat portion 109 and associated straps are further illustrated and described with respect to FIG. 2.

Handle 123 is coupled to the seat portion, wherein handle 123 is used to lift and carry main body 101 as well as corresponding components coupled to main body 101. In this figure, handle 123 is coupled to strap 113. Alternatively, handle 123 may be connected strap 115.

Auxiliary cylinder assembly 117 is a sack coupled to main body 101, wherein the auxiliary cylinder assembly 117 is configured to hold an auxiliary gas cylinder, the auxiliary gas cylinder being an emergency gas cylinder generally found in RIT bags. In this figure, auxiliary cylinder assembly 117 is comprised of cross straps 119*a-b* and straps 121*a-b*. Auxiliary cylinder assembly 117 has opening 125 that is configured to open and close so as to regulate removal of an auxiliary gas cylinder. In this figure, opening 125 is regulated by drawstring 127 that passes through corresponding loops located at each end of straps 119*a-b*.

Referring now to FIG. 2, a front view of equipment carrying system 100 of FIG. 1 positioned on a primary air cylinder while equipped with an auxiliary air cylinder is illustrated.

In this figure, equipment carrying system 100 is positioned on primary air cylinder 131. Primary air cylinder 131 is an air cylinder of a SCBA that is primarily used for breathing by a carrier of the SCBA. Primary air cylinder 131 has valveless end 133 and valve stem 134*a* opposite of valveless end 133. Furthermore, primary air cylinder 131 has circumference 135. Seat portion 107 (i.e., straps 109, 113, and 115) of equipment carrying system 100 is configured to receive valveless end 133 of primary air cylinder 131. Strap 109 is configured to wrap around circumference 135. Straps 113 and 115 crosses over valveless end 133. Main body 101, auxiliary cylinder assembly 117, and handle 123 hang from seat portion 107 on valveless end 133.

In this figure, auxiliary cylinder 137 is positioned within auxiliary cylinder assembly 117 and is constrained to auxiliary cylinder assembly 117 by drawstring 125 that closes opening 125. Auxiliary cylinder 137 is an auxiliary gas cylinder having valve stem 134*b*.

Referring now to FIG. 3, a back view of equipment carrying system 100 of FIG. 2 is illustrated.

In this figure, preferred dimensions of equipment carrying system 100 are such that any additional features coupled to main body 101 (e.g., auxiliary cylinder assembly 117, pouches, reels, etc.) do not exceed a shoulder width of a carrier (i.e., constrained between shoulder lines 141*a* and 141*b*) and a height beyond strap 115 that crosses over valveless end 133. The preferred dimensions are chosen to not interfere arm freedom of movement of the carrier as well as not producing further extensions from the carrier as a result of primary air cylinder 131 of SCBA gear. In other words, the preferred dimensions of equipment carrying system 100 and accessories should fit within a rectangular prism constrained by the width of shoulders of the carrier, a length of the primary air cylinder, and a depth corresponding to a diameter associated with the circumference of the primary air cylinder.

Referring now to FIG. 4, a right-hand view of equipment carrying system of FIG. 2 is illustrated.

In this figure, additional detailed features of seat portion 107 and handle 123 are illustrated.

Referring now to FIG. 5, a back view of equipment carrying system of FIG. 2 having additional hose reels, pouches, and high visibility patches is illustrated.

In general, high visibility patches may be fastened to equipment carrying system 100 to improve visibility in low lighting situations. In this figure, high visibility patch 173*a* is coupled to auxiliary cylinder assembly 117, and high visibility patches 173*b-c* are attached.

In general, pouches may be fastened to main body 101. Pouches may be used to store emergency equipment such as first aid kits, respiratory masks, hoses, etc. In this figure, pouches 171*a-b* are coupled to main body 101 using stitching or loop fasteners.

In general, hose reels may optionally be coupled to equipment carrying system 100, wherein the hose reels may be used to transfer air from the auxiliary gas cylinder. In this figure, reel assembly 151*a* is coupled to auxiliary cylinder assembly 117. In general, reel assembly 151*a* is used for the transfer of air from auxiliary cylinder 137 as part of a High Pressure System (HPS) connection. In other words, reel assembly 151*a* is configured to selectively transfer air from auxiliary cylinder 137 to a primary air cylinder associated with a third party prior to breathing by the third party. In this figure, reel assembly 151*b* is coupled to main body 101.

In general, reel assembly 151*b* is used for the transfer of air from auxiliary cylinder 137 as part of a Buddy Breathing System (BBS) connection. In other words, reel assembly 151*b* is configured to selectively transfer air from auxiliary cylinder 137 to a third party. Reel assemblies 151*a-b* each include a hose (i.e., hose 155*a-b*, respectively) configured to selectively transfer air from auxiliary cylinder 137 to a third party. Furthermore, reel assemblies 151*a-b* may each be configured to include a retracting mechanism (i.e., retracting mechanism 153*a-b*) to permit selective automatic retracting of hose 115*a-b* respectively.

In this figure, manifold 161 is coupled to valve stem 134*b* of auxiliary cylinder 137 using manifold port 163*a*, permitting air to enter manifold 161 from auxiliary cylinder 137. Manifold 161 may selectively transfer air to either manifold port 163*b* and/or 163*c* using a respective set of valves. Hose 155*a*, having ends 157*a* and 157*b*, is connected to port 163*a* using end 157*b*, and end 157*a* may be connected to a BBS. Hose 155*b*, having ends 159*a* and 159*b*, is connected to port 163*b* using end 157*b*, and end 159*a* may be connected to an HPS. Air network connections stemming from auxiliary tank 137 are further depicted and illustrated with respect to FIG. 6.

Now referring to FIG. 6, air network environment 200 illustrates air connections stemming from an auxiliary air cylinder of FIG. 2 to a third party.

In this figure, air connections between respective components are permitted by a plurality of hoses and hose fittings located at each end of the hoses. Furthermore, any number of control valves (not shown) may be used to selectively interrupt air flow between the components.

In this figure, auxiliary cylinder 137 is connected to manifold 161. Manifold 161 may be connected to Buddy Breathing System 201 and/or a High Pressure System 203. Buddy Breathing System 201 includes, but is not limited to, regulator 205*a* and respirator 207*a*. Regulator 205*a* converts incoming air pressure provided by auxiliary cylinder 137 and outputs an air pressure to a respirator suitable for direct breathing by a third party. In other words, air is passed directly to the third party for breathing at an air pressure suitable for direct breathing.

High Pressure System 203 includes, but is not limited to, manifold 209 and primary cylinder 211. In general, manifold 209, primary cylinder 211, regulator 205*b*, and respirator 207*b* correspond to a SCBA associated with a third party. In this environment, primary cylinder 211 is a depleted gas cylinder. Since primary cylinder 211 is depleted, primary cylinder 211 is effectively a storage tank for receiving air from auxiliary cylinder 137. In this figure, manifold 206 is connected to primary cylinder 211 and regulator 205*b*. Furthermore, the connection between manifold 161 and manifold 209 permits air to transfer from auxiliary cylinder 137 to primary cylinder 211, therefore refilling primary cylinder 211. Manifold 209 provides air to regulator 205*b* and subsequently respirator 207*b*, wherein the air from manifold 209 is provided by either or both auxiliary cylinder 137 and primary cylinder 211. Regulator 205*b* is of similar form and function as regulator 205*a*. Respirator 207*b*, connected to regulator 205*b*, is of similar form and function as respirator 207*a*.

As a method of using equipment carrying system 100, a user first obtains equipment carrying system 100, then positions seat portion 107 over valveless end 133 of primary air cylinder 131, wherein main body 101, auxiliary cylinder assembly 117, and handle 123 of the system are permitted to hang from seat portion 107 on the valveless end of primary gas cylinder 131. The user may remove equipment carrying system 100 by using handle 123 to lift the system away from valveless end 133 of primary air cylinder 131.

To provide air from auxiliary cylinder 137 to a third party using BBS, the user extends end 159*a* of hose 155*b* from reel 151*b*, wherein reel 151*b* is in communication with auxiliary cylinder 137 housed by auxiliary cylinder assembly 117. The user then connects end 159*a* to a buddy breathing system of the third party and then transfers air from auxiliary cylinder 137 to the buddy breathing system, wherein output air of the buddy breathing system is at an air pressure suitable for direct breathing by the third party. When the buddy breathing system is no longer need by the third party, the user disconnects end 159*a* from the buddy breathing system and retracts end 159*a* of hose 155*b* back to reel 151*b*.

To provide air from auxiliary cylinder 137 to a third party using HPS, the user extends end 157*a* of hose 155*a* from reel 151*a*, wherein reel 151*a* is in communication with auxiliary cylinder 137. The user then connects end 157*a* to a high pressure system of the third party and then transfers air from auxiliary cylinder 137 to primary cylinder 211. The user then disconnects end 157*a* from the high pressure system and retracts end 157*a* of hose 155*a* back to reel 151*a*.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An equipment carrying system configured for sliding over a valveless end of a gas cylinder, the system comprising:

a main body having a plurality of straps forming a webbing;

a seat portion formed within the main body, the seat portion being configured to receive the valveless end of the gas cylinder;

an auxiliary cylinder assembly coupled to the main body, the auxiliary cylinder assembly including a second gas cylinder;

a handle coupled to the seat portion, the handle configured to be used to lift and carry the main body;

wherein the main body, the auxiliary cylinder assembly, and the handle are configured to hang from the seat portion on the valveless end of the gas cylinder;

a first reel assembly in communication with the second gas cylinder, the first reel assembly includes a hose configured to selectively transfer air from the second gas cylinder to a third party, the first reel assembly includes a retracting mechanism to permit the selective automatic retracting of the hose; and a second reel assembly in communication with the second gas cylinder, the second reel assembly includes a second hose configured to selectively transfer air from the second gas cylinder to the third party.

2. The system of claim 1, wherein the seat portion is adjustable to accommodate different sized gas cylinders.

3. The system of claim 2, wherein the seat portion has a first strap configured to wrap around a circumference of the gas cylinder, the first strap being adjustable to different circumferences.

4. The system of claim 3, wherein the seat portion includes a second strap configured to cross over the valveless end of the gas cylinder, the second strap being adjustable to adjust a seat height of the valveless end of the gas cylinder within the seat portion.

5. The system of claim 2, wherein the seat portion includes a second strap configured to cross over the valveless end of the gas cylinder, the second strap being adjustable to adjust a seat height of the valveless end of the gas cylinder within the seat portion.

6. The system of claim 1, wherein the auxiliary cylinder assembly is configured to open and close about an opening so as to regulate removal of the second gas cylinder.

7. The system of claim 1, wherein the second gas cylinder includes air, the air within the second gas cylinder is transferable to a third party.

8. The system of claim 1, further comprising a storage tank, wherein the air is configured to be passed to the storage tank prior to breathing by the third party.

9. A method of using an equipment carrying system configured for sliding over a valveless end of a gas cylinder, the method comprising:

obtaining an equipment carrying system of claim 1;

positioning the seat portion of the equipment carrying system over the valveless end of the gas cylinder, wherein the main body, the auxiliary cylinder assembly, and the handle of the system are permitted to hang from the seat portion on the valveless end of the gas cylinder.

10. The method of claim 9, further comprising:

removing the equipment carrying system from the valveless end of the gas cylinder using the handle.

11. The method of claim 9, further comprising:

extending a first end of the hose from the first reel assembly, the first reel assembly in communication with the second gas cylinder housed by the auxiliary cylinder assembly, the hose configured to selectively transfer air from the second gas cylinder;

connecting the first end of the hose to a buddy breathing system of a third party;

transferring air from the second gas cylinder to the buddy breathing system, wherein output air of the buddy breathing system is at an air pressure suitable for direct breathing;

disconnecting the first end of the hose from the buddy breathing system; and retracting the first end of the hose back to the first reel assembly.

12. The method of claim 11, wherein the first reel assembly retracts the first end of the hose using the retracting mechanism that permits selective automatic retracting of the hose.

13. The method of claim 11, further comprising:

extending a first end of the second hose from the second reel assembly, the second reel assembly in communication with the second gas cylinder, the second hose configured to selectively transfer air from the second gas cylinder;

connecting the first end of the second hose to a storage tank of the third party;

transferring air from the second gas cylinder to the storage tank;

disconnecting the first end of the second hose from the storage tank; and retracting the first end of the second hose back to the second reel assembly.

14. The method of claim 9, further comprising:

extending a first end of the second hose from the second reel assembly, the second reel assembly in communication with the second gas cylinder, the second hose configured to selectively transfer air from the second gas cylinder;

connecting the first end of the second hose to a storage tank of a third party;

transferring air from the second gas cylinder to the storage tank;

disconnecting the first end of the second hose from the storage tank; and retracting the first end of the second hose back to the second reel assembly.

* * * * *